W. STUEBING, Jr.
LIFTING TRUCK.
APPLICATION FILED FEB. 18, 1915.

1,257,650.

Patented Feb. 26, 1918.
3 SHEETS—SHEET 1.

Witnesses
L. M. Dunlap
Saml C. Cox

Inventor
William Stuebing Jr.
by John W. Strelli
Attorney

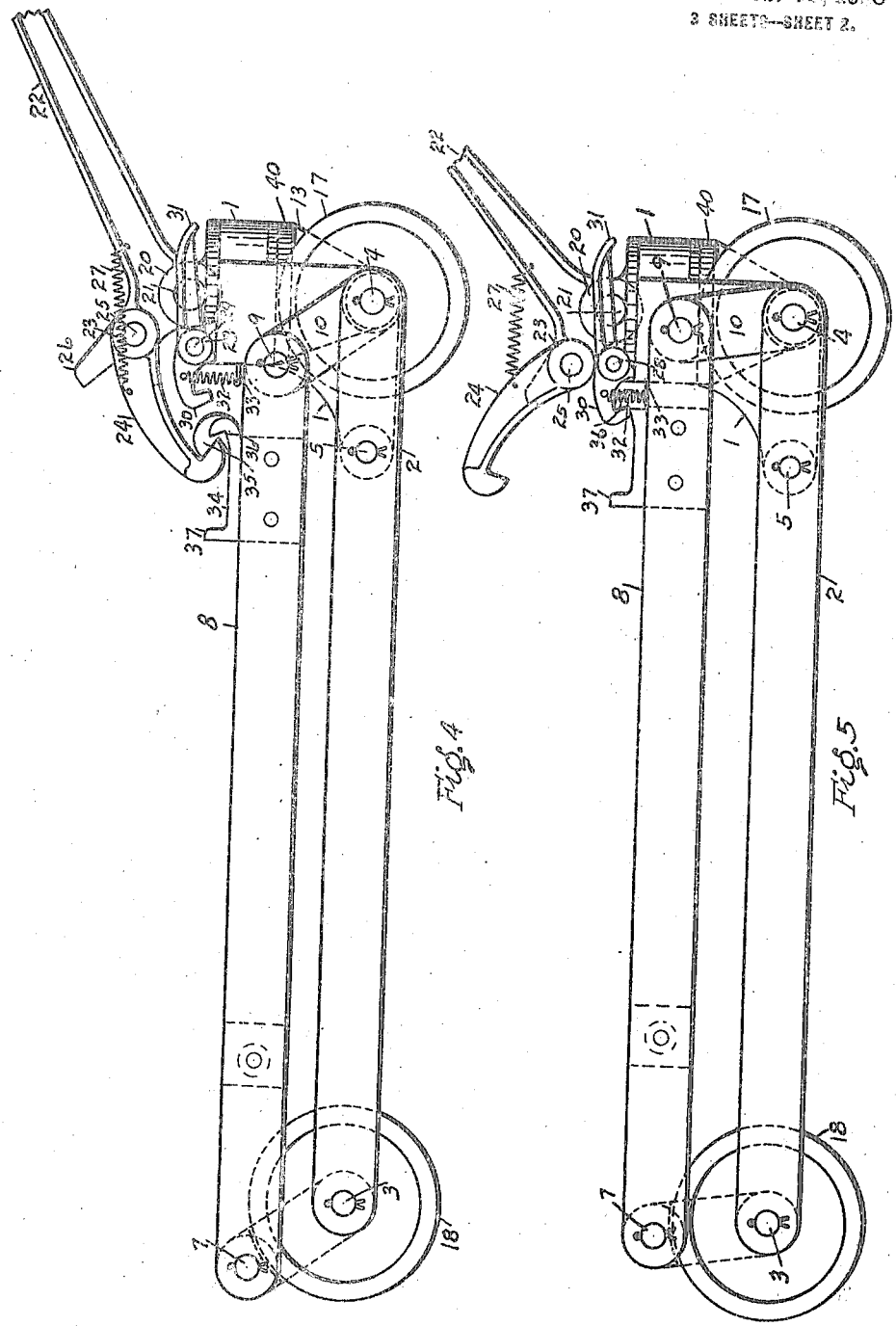

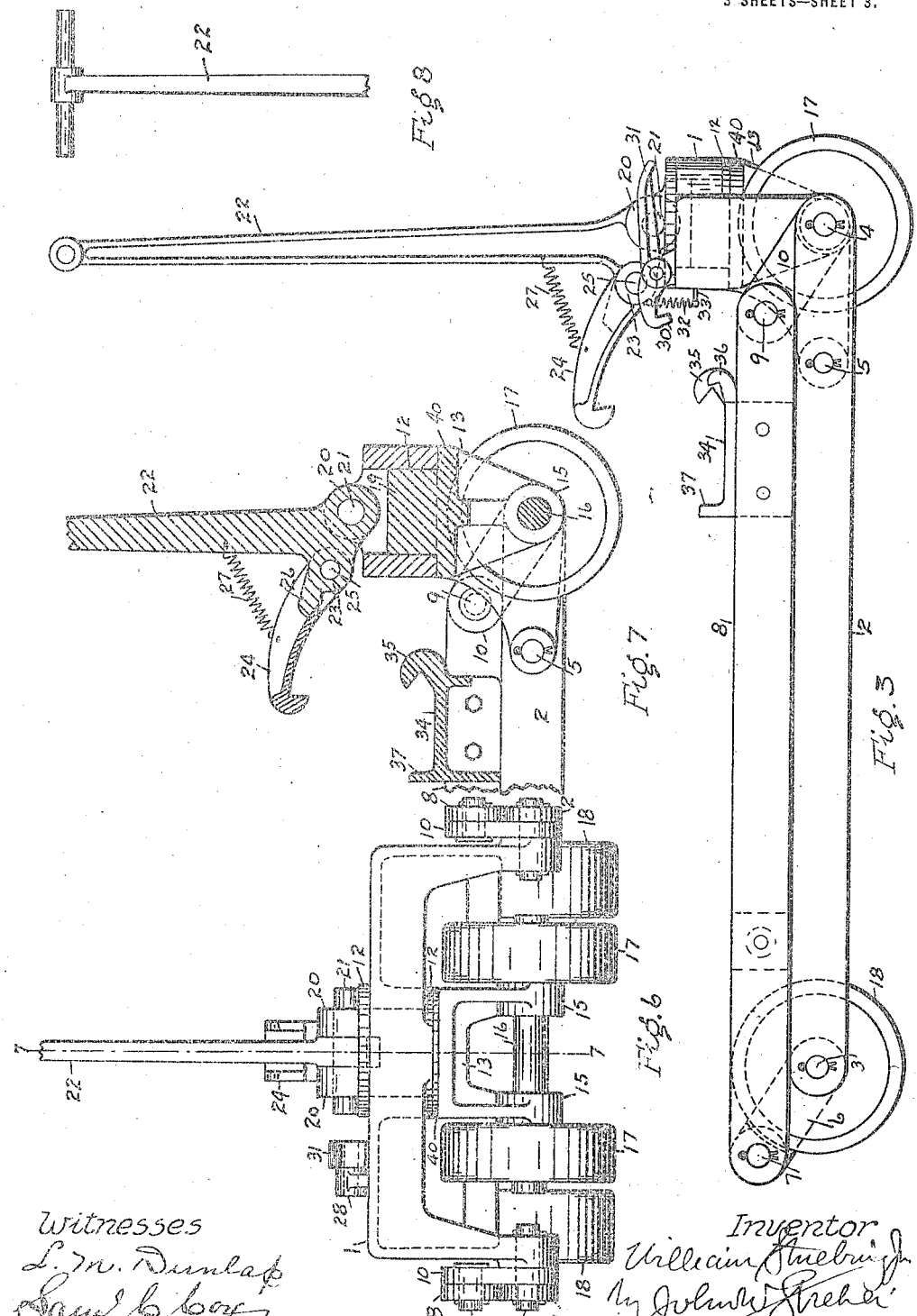

UNITED STATES PATENT OFFICE.

WILLIAM STUEBING, JR., OF CINCINNATI, OHIO, ASSIGNOR, BY MESNE ASSIGNMENTS, TO THE STUEBING TRUCK COMPANY, A CORPORATION OF OHIO.

LIFTING-TRUCK.

1,257,650.  Specification of Letters Patent.  Patented Feb. 26, 1918.

Application filed February 18, 1915. Serial No. 9,122.

*To all whom it may concern:*

Be it known that I, WILLIAM STUEBING, Jr., a citizen of the United States, residing at the city of Cincinnati, in the county of Hamilton and State of Ohio, have invented certain new and useful Improvements in Lifting-Trucks, of which the following is a specification.

My invention belongs to that class of trucks which are used in lifting and trucking loads usually placed on platforms; the truck being capable of moving under the platform and then elevating the same on a lifting platform forming part of the truck.

It is highly efficient in service, very simple in construction and cheap of manufacture.

One of the main features of my invention consists in providing means for elevating the lifting platform through the agency of a handle or tongue, and then locking the same in an elevated position, and then automatically releasing the elevating mechanism, rendering it possible to turn the handle and front wheels in any direction desired or in a complete circle—enabling the operator to pull, push, or turn the load or truck in any direction.

Other features and advantages of construction and operation will readily become apparent from the following specification.

Figure 1:
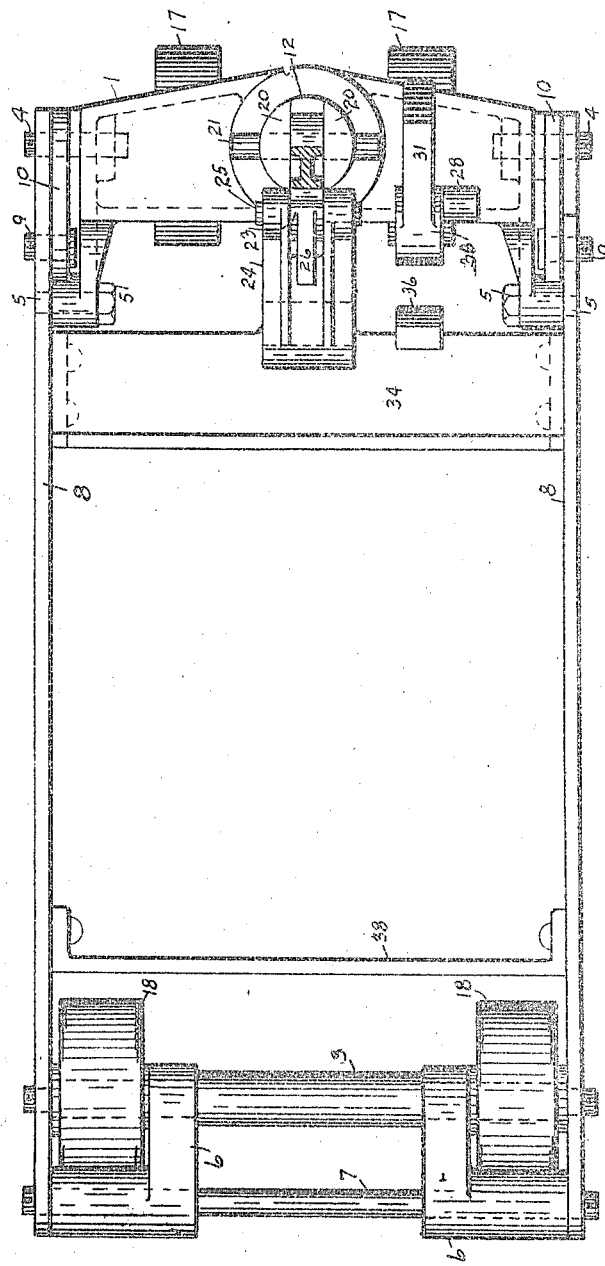
Figure 2:
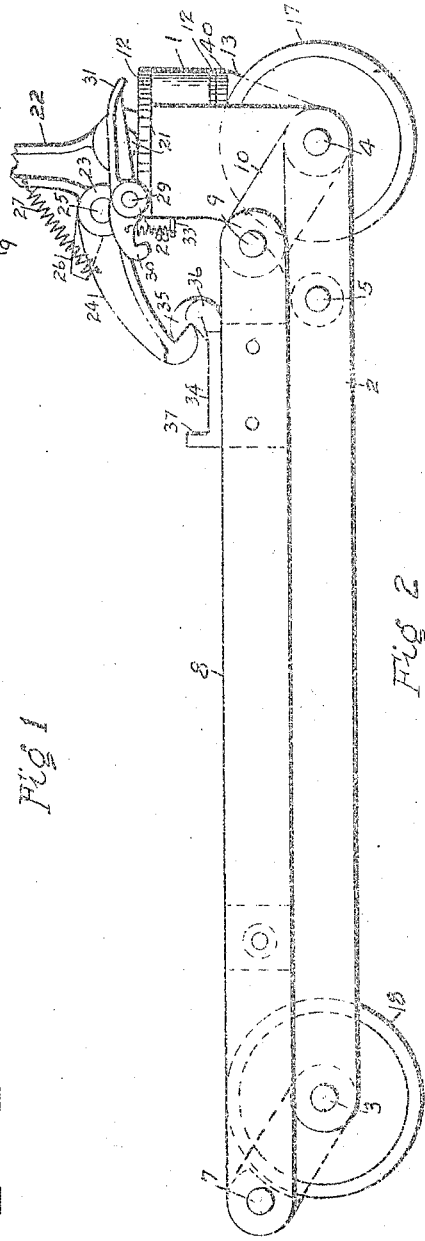

In the accompanying drawing forming part of this specification:

Figure 1, is a plan view of the truck,

Fig. 2, is a side elevation of the truck with the platform in its lowered position, the hook mechanism of the handle engaged with the hook mechanism of the platform, Fig. 3, is a side elevation of the truck with the platform lowered, with the hook mechanism of the handle disconnected from the hook mechanism of the platform, Fig. 4, is a side elevation of the truck, with the platform in a partly raised position, showing the hook mechanism of the handle and the hook mechanism of the platform engaged, Fig. 5, is a side elevation of the truck, with the platform elevated to its fullest extent and locked and also showing the hook mechanism of the handle disengaged at this point, Fig. 6, is a front view of the truck, Fig. 7, is a section view on line 7—7 of Fig. 6, showing the mechanism of handle disengaged from the mechanism of the platform, the platform being at its lowest position, and Fig. 8, is a front view of the top part of the handle shown in Fig. 3.

The truck consists of a lower frame consisting of a front head 1, two rearwardly extending connecting bars 2 connected to the back axle 3 and connected in the front with the head 1 through the pins 4 and 5. The lifting or elevating platform of the truck consists of two links 6, fulcrumed on the shaft 3 and carrying at their other bearing ends the shaft 7. To the shaft 7 I connect on both sides the link bars 8, extending forward to the front of the truck and connected through the pins 9 to the links 10. The links 10 in turn are connected through pins 4 to the front head.

In the front head 1, I carry the bearing 12 and through this bearing I operate the fork 13 carrying at its bottom end the bearings 15—15, and through these bearings I place a shaft 16 and on said shaft I place the two front wheels 17 on the outside of the fork 13, the shaft 16 making a bearing for the said wheels. On the shaft 3 I place the rear wheels 18, thus constructing a four wheel device.

The fork 13 with its bearing 19 operating in bearing 12 will allow the two front wheels 17 to swivel as in the manner of wagons.

The fork 13 is constructed with a flange 40, which flange acts as a thrust bearing against the face of the bearing 12 on head 1 thus supporting, through the agency of the wheels 17 and fork 13, the head 1.

At the other end of fork 13, I carry the two bearings 20—20. Through these bearings I place the shaft 21 in such a position as to lock the fork 13 between the upper and lower face of bearing 12 in the head 1. Pivotally connected on shaft 21 and operating between the bearings 20—20 of fork 13, I connect the handle, lever or tongue 22.

At the lower end of the handle, I provide the bell crank lever extension 23, the lower face of which is intended to engage the front head 1 to limit rearward movement of the handle, and to this bell crank lever extension 23 I pivotally connect the hook 24 by pin 25. Extending from the bell crank lever extension 23 is a short stop arm 26. Between the tongue 22 and the hook 23, I connect a spring 27. The short arm 26 acts as a stop for hook 24 limiting its travel, when the spring 27 operates to pull said hook back into its normal position, which operation will be hereinafter described.

On the top of the head 1, I place the bearing 28 carrying a pin 29, which pin supports the pawl 30 and extending forward on the pawl, I provide the treadle 31; the two being made integral and operate on the pin 29 as a pivotal point.

To the pawl 30 I connect the spring 32 which at its other end is fastened to front head 1 at point 33.

On the elevating platform I connect the bridge 34 extending across the platform and connecting at each side with link bars 8—8, and on the bridge, at its front I place an engaging hook 35 for the hook 24 and another engaging hook 36 for the pawl 30.

At the rear the bridge 34 is provided with a raised abutment 37 which limits the forward movement of the platform upon which the articles to be lifted are placed; these platforms are usually made of wood and are raised so that the truck can be placed under them when down in order to elevate same.

In order to strengthen the elevating frame I connect the bar 38 to link bars 8—8.

To operate the truck when the elevating platform is in its lowest position, the operator forces the hook 24 down into engagement with the hook 35 on bridge 34, as shown in Fig. 2. The handle 22 is then pulled into a horizontal position forcing the link bars 8 which are connected to the bridge 34, to elevate on the links 10 and allow the pawl 30 to engage with the hook 36 on bridge 34, thus locking the elevated platform with its load, and to disengage the hook 24 the operator again raises handle 22 and this forces the hook 24 rearwardly, until it passes out of contact with the hook 35, and then, through the spring 27 the hook 24 is then quickly and automatically pulled up into normal position against stop 26, see Fig. 5; the spring 27 having been placed at tension when the hook 24 was first placed into engagement with the hook 35. In Fig. 4 the platform is partly raised and not locked showing hook 24 connected and held in position by the load on the elevating platform.

After the platform is raised and locked into position and the hook 24 has automatically been released from hook 35, the tongue or lever 22 is then free to turn in a complete circle laterally, thus allowing the fork 13 which carries the two front wheels 17 to turn in all directions. When the elevating platform is down the handle and front wheels can also be moved laterally and in a circle the same as when the platform is elevated; thus it will be seen that the handle and wheels are free to turn in all directions when the platform is down or up. At no point in the range of this free turning movement of the handle, can the handle be placed in a position wherein the hook 24 can, through any movement of the handle or of the platform, become engaged with the hook 35, without first requiring manual foot or hand depression of the hook 24 into the engaging plane of the hook 35.

In order to lower the elevating platform after it has been elevated, the operator steps on treadle part 31 of pawl 30, thus disconnecting pawl 30 from hook 36, allowing the platform to descend.

While I have described one specific construction of my truck, it will be readily apparent that I may alter and change the same without departure from the spirit of the invention, and thus form modifications thereof, and I wish to be understood as claiming that such modifications will still fall within the scope of my invention.

What I claim as new and my invention and desire to secure by Letters Patent is:

1. In an elevating truck, in combination, a base, an elevating platform, a front steering wheel having a swivel connection with said base, a steering handle pivoted to rock upon the free upper part of said swivel and having an unlimited range of steering movement, and means for connecting said platform to said handle to elevate said platform comprising a member carried by one of said parts and tending normally to remain in or to return to a position in which it will not interfere with the movement of said handle, the connections between said member and the other part being constituted by coöperating engaging surfaces on said member and said part so arranged with respect to the direction of elevating movement as to form a positive platform elevating connection.

2. In an elevating truck, in combination, a base, an elevating platform, a front steering wheel mount having pivotal connection with said base, a steering handle pivoted to rock upon the free upper part thereof, and means for connecting said platform to said handle to elevate said platform comprising a pivoted member carried by one of said parts and tending normally to remain in or to return to a position in which it will not interfere with the movement of said handle, the connections between said pivoted member and the other part forming a positive platform elevating connection when said pivoted member is manually forced into engagement with said other part.

3. In a lifting truck, the combination with a base, an elevating platform and a pivoted steering handle, of means for connecting said platform to said handle to elevate said platform, comprising a manually operable member connected to one of said parts and tending to move out of connected relation to the other into a position where it will not interfere with movement of the handle when used for steering.

4. In a lifting truck, the combination with a base, an elevating platform and a handle lever pivotally arranged for steering movement, of means for elevating said platform comprising a pivoted member on one of said parts and a relatively fixed member on the other of said parts, said pivoted member being normally out of connecting position, in which it will not interfere with the movement of said handle, said pivoted member and said relatively fixed member brought into interlocked coupling relation by movement of the handle and by manual force applied to the pivoted member forcing said member out of its normal position into the path of engagement with the relatively fixed member so that the platform can be raised by movement of the handle, and provision for retaining the platform in elevated position.

5. In a lifting truck, the combination with a base, an elevating platform and a handle lever pivotally arranged for steering movement, and means for connecting said platform and handle lever to elevate the platform comprising a pivoted member carried by one of said parts, a spring tending to normally hold said pivoted member in a position in which it will not interfere with the movement of said handle, the connections between said pivoted member and the other part forming a positive platform elevating connection when said pivoted member is manually forced into engagement with said other part.

6. A truck comprising a main frame, a steering wheel member connected therewith, a handle connected to said steering wheel member for guiding the same, said handle being pivoted to swing, an elevating frame mounted on said main frame and movable up and down relatively thereto, and means carried by said handle and adapted to engage and lift said elevating frame when said handle is moving downwardly, said means carried by the handle tending to automatically move out of connected relation when the handle is moved in a direction for disengagement, into a position of non-interference with the handle when used for steering.

WILLIAM STUEBING, Jr.

Witnesses:
H. E. CARSTENS,
SAML. C. COX.